US012585159B2

(12) United States Patent
Li et al.

(10) Patent No.: US 12,585,159 B2
(45) Date of Patent: Mar. 24, 2026

(54) ANTI-PEEPING DISPLAY DEVICE

(71) Applicants: Beijing BOE Display Technology Co., Ltd., Beijing (CN); BOE Technology Group Co., Ltd., Beijing (CN)

(72) Inventors: Jiao Li, Beijing (CN); Shiming Shang, Beijing (CN); Xiaoqing Peng, Beijing (CN); Kaixuan Wang, Beijing (CN); Weixing Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 59 days.

(21) Appl. No.: 18/631,757

(22) Filed: Apr. 10, 2024

(65) Prior Publication Data

US 2024/0345446 A1 Oct. 17, 2024

Related U.S. Application Data

(63) Continuation of application No. PCT/CN2021/139284, filed on Dec. 17, 2021.

(51) Int. Cl.
*G02F 1/137* (2006.01)
*F21V 8/00* (2006.01)
(Continued)

(52) U.S. Cl.
CPC ........... *G02F 1/137* (2013.01); *G02B 6/0036* (2013.01); *G02B 6/0053* (2013.01);
(Continued)

(58) Field of Classification Search
CPC ......... G02F 1/133512; G02F 1/133509; H01L 29/78633; H01L 51/5284
See application file for complete search history.

(56) References Cited

U.S. PATENT DOCUMENTS

2008/0080040 A1* 4/2008 Mimura .................. G02B 5/201
359/885
2009/0109169 A1* 4/2009 Sumiyoshi ........... G09G 3/3406
345/102
(Continued)

FOREIGN PATENT DOCUMENTS

CN 204790254 U 11/2015
CN 106990602 A 7/2017
(Continued)

OTHER PUBLICATIONS

Liu, English translation for CN-111856819-A (Year: 2020).*
PCT/CN2021/139284 international search report dated Apr. 1, 2022.

*Primary Examiner* — Jonathan Y Jung
(74) *Attorney, Agent, or Firm* — IPro, PLLC

(57) ABSTRACT

An anti-peeping display device, including a collimated backlight module and a liquid crystal display panel that are stacked. The liquid crystal display panel is located on a light exit side of the collimated backlight module. The liquid crystal display panel includes an array substrate and an opposite substrate that are disposed opposite to each other. The array substrate is close to the collimated backlight module, and the opposite substrate is away from the collimated backlight module. The opposite substrate includes: a base substrate, the base substrate having a plurality of light-transmissive regions and non-light-transmissive regions located between adjacent light-transmissive regions; and a reflective layer located on the base substrate, the orthographic projection of the reflective layer on the base substrate overlapping the orthographic projections of at least parts of the non-light-transmissive regions on the base substrate, and the reflective layer being configured to reflect ambient light.

12 Claims, 10 Drawing Sheets

(51) Int. Cl.

| | | |
|---|---|---|
| *G02F 1/13* | (2006.01) | |
| *G02F 1/1333* | (2006.01) | |
| *G02F 1/1334* | (2006.01) | |
| *G02F 1/1335* | (2006.01) | |
| *G02F 1/13357* | (2006.01) | |

(52) U.S. Cl.

CPC ......... *G02B 6/0055* (2013.01); *G02F 1/1323* (2013.01); *G02F 1/133357* (2021.01); *G02F 1/133365* (2013.01); *G02F 1/1334* (2013.01); *G02F 1/133512* (2013.01); *G02F 1/133514* (2013.01); *G02F 1/133553* (2013.01); *G02F 1/133615* (2013.01); *G02F 2202/22* (2013.01)

(56) References Cited

U.S. PATENT DOCUMENTS

| | | | | |
|---|---|---|---|---|
| 2010/0117943 | A1* | 5/2010 | Pak | ...................... G09G 3/3648 |
| | | | | 349/110 |

| | | | | |
|---|---|---|---|---|
| 2010/0265435 | A1 | 10/2010 | Hwang et al. | |
| 2013/0141678 | A1* | 6/2013 | Chin | ................. G02F 1/133345 |
| | | | | 445/24 |
| 2020/0379163 | A1* | 12/2020 | Meng | ................... G02B 6/0031 |
| 2021/0195714 | A1 | 6/2021 | Woodgate et al. | |
| 2021/0405423 | A1* | 12/2021 | Yang | ................... G02F 1/13476 |
| 2022/0121066 | A1* | 4/2022 | Kawahira | ............. G06F 3/0412 |
| 2023/0052905 | A1* | 2/2023 | Koito | ............... G02F 1/133512 |
| 2023/0418111 | A1* | 12/2023 | Zhang | ............... G02F 1/133526 |

FOREIGN PATENT DOCUMENTS

| | | | | | |
|---|---|---|---|---|---|
| CN | 107703654 | A | 2/2018 | | |
| CN | 109709738 | A | 5/2019 | | |
| CN | 111384139 | A | 7/2020 | | |
| CN | 111856819 | A | * 10/2020 | .......... | G06V 10/147 |
| CN | 111868585 | A | 10/2020 | | |
| CN | 212207730 | U | 12/2020 | | |
| CN | 212623461 | U | 2/2021 | | |
| JP | 2023026922 | A | * 3/2023 | ......... | G02F 1/13471 |

* cited by examiner

ANTI-PEEPING DISPLAY DEVICE

CROSS-REFERENCE TO RELATED APPLICATIONS

This disclosure is a continuation of International Application No. PCT/CN2021/139284, filed on Dec. 17, 2021, which is hereby incorporated by reference in its entirety.

TECHNICAL FIELD

The present disclosure relates to the field of display technology, in particular to an anti-peeping display device.

BACKGROUND

With the rapid development of display technology, its display range and application scenarios are constantly expanding. The application scenario of the anti-peeping display came into being. In this scenario, the anti-peeping display can provide the viewer with a sufficiently private viewing experience, greatly improving the private display effect in the special display field.

SUMMARY

Embodiments of the present disclosure provide an anti-peeping display device, including a collimated backlight module and a liquid crystal display panel that are stacked, and the liquid crystal display panel is on a light emergent side of the collimated backlight module;

the liquid crystal display panel includes an array substrate and an opposite substrate opposite to each other, the array substrate is close to the collimated backlight module, and the opposite substrate is away from the collimated backlight module;

the opposite substrate includes:

a base substrate, provided with a plurality of light-transmitting regions and non-light-transmitting regions between the light-transmitting regions that are adjacent to each other; and a reflective layer on the base substrate, an orthographic projection of the reflective layer on the base substrate overlaps with an orthographic projection of at least part of the non-light-transmitting region on the base substrate, and the reflective layer is configured to reflect ambient light.

In a possible implementation, in the above anti-peeping display device provided by the embodiments of the present disclosure, the orthographic projection of the reflective layer on the base substrate completely overlaps with the orthographic projection of the non-light-transmitting regions on the base substrate.

In a possible implementation, in the above anti-peeping display device provided by the embodiments of the present disclosure, the reflective layer is on one side of the base substrate facing the array substrate, and the opposite substrate further includes a black matrix layer on one side of the reflective layer facing the array substrate, the black matrix layer defines the light-transmitting regions and the non-light-transmitting regions.

In a possible implementation, in the above anti-peeping display device provided by the embodiments of the present disclosure, a pattern of the reflective layer is the same as a pattern of the black matrix layer.

In a possible implementation, in the above anti-peeping display device provided by the embodiments of the present disclosure, the reflective layer is on one side of the base substrate facing the array substrate, and the opposite substrate further includes a black matrix layer on one side of the reflective layer facing the array substrate, the black matrix layer defines the light-transmitting regions and the non-light-transmitting regions; and the reflective layer is reused as the black matrix layer.

In a possible implementation, in the above anti-peeping display device provided by the embodiments of the present disclosure, a material of the reflective layer is metal.

In a possible implementation, in the above anti-peeping display device provided by the embodiments of the present disclosure, the reflective layer is grounded.

In a possible implementation, the above anti-peeping display device provided by the embodiments of the present disclosure further includes a liquid crystal polymer structure between the collimated backlight module and the liquid crystal display panel; the liquid crystal polymer structure includes: a first substrate and a second substrate opposite to each other, a liquid crystal polymer layer between the first substrate and the second substrate, a first electrode between the first substrate and the liquid crystal polymer layer, and a second electrode layer between the second substrate and the liquid crystal polymer layer; and the liquid crystal polymer structure is configured to control a refractive index of the liquid crystal polymer layer by applying an electric field between the first electrode layer and the second electrode layer, so that the liquid crystal polymer layer switches between a transparent state and an opaque state.

In a possible implementation, in the above anti-peeping display device provided by the embodiments of the present disclosure, the collimated backlight module includes a side-incident light source and a dimming structure, and the side-incident light source is on a light incident side of the dimming structure; the side-incident light source is configured to provide incident light to the dimming structure; and the dimming structure is configured to adjust a light emergent direction of the incident light, so that the light emergent side of the dimming structure emits collimated light.

In a possible implementation, in the above anti-peeping display device provided by the embodiments of the present disclosure, the dimming structure includes a reflective sheet and a light guide plate that are stacked; the light guide plate is provided with a light emergent surface and a bottom surface opposite to each other, the bottom surface of the light guide plate is provided with a plurality of dimming microstructures, the reflective sheet is located on the bottom surface of the light guide plate, and the incident light is configured to be incident from a side surface of the light guide plate; and the dimming structure further includes: a reverse prism sheet on one side of the light guide plate away from the reflective sheet, and an anti-peeping film on one side of the reverse prism sheet away from the reflective sheet.

In a possible implementation, in the above anti-peeping display device provided by the embodiments of the present disclosure, the opposite substrate further includes a color resist layer on one side of the black matrix layer away from the base substrate, a planarization layer on one side of the color resist layer away from the base substrate, and a spacer layer on one side of the planarization layer away from the base substrate; the color resist layer includes a plurality of color resists, and the plurality of color resists is in the light-transmitting region.

In a possible implementation, in the above anti-peeping display device provided by the embodiments of the present disclosure, the liquid crystal display panel further includes: a liquid crystal layer between the array substrate and the opposite substrate, a first polarizer on one side of the array substrate away from the opposite substrate, and a second polarizer on one side of the opposite substrate away from the array substrate.

DETAILED DESCRIPTION

Figure 1:
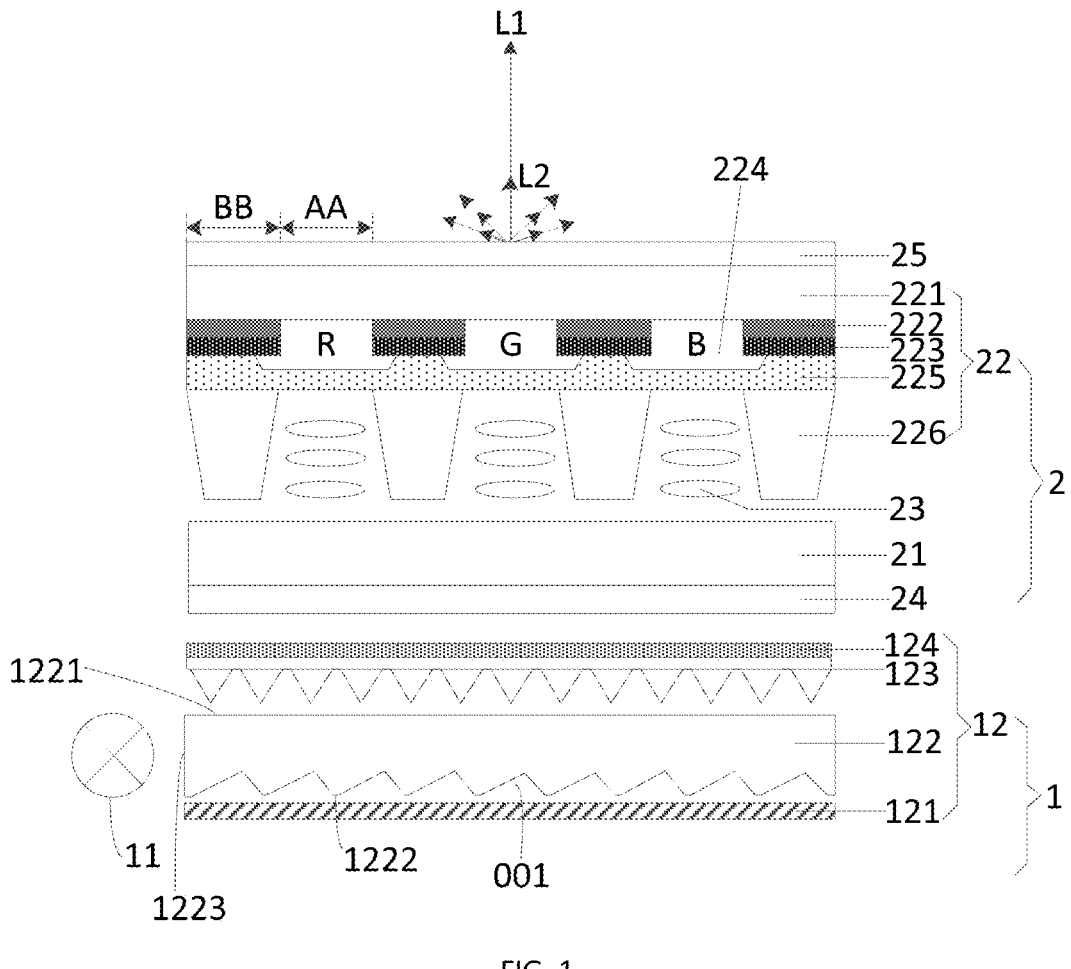
FIG. 1 is a schematic structural diagram of an anti-peeping display device provided by embodiments of the present disclosure.

In order to make the purpose, technical solutions and advantages of the embodiments of the present disclosure clearer, the technical solutions of the embodiments of the present disclosure will be clearly and completely described below in conjunction with the accompanying drawings of the embodiments of the present disclosure. Apparently, the described embodiments are some of the embodiments of the present disclosure, not all of them. And in the case of no conflict, the embodiments in the present disclosure and the features in the embodiments can be combined with each other. Based on the described embodiments of the present disclosure, all other embodiments obtained by persons of ordinary skill in the art without creative effort fall within the claimed scope of the present disclosure.

Unless otherwise defined, the technical terms or scientific terms used in the present disclosure shall have the usual meanings understood by those skilled in the art to which the present disclosure belongs. The words "including" or "comprising" and similar words used in the present disclosure mean that the elements or things appearing before the word include the elements or things listed after the word and their equivalents, without excluding other elements or things. Words such as "connected" or "coupled are not limited to physical or mechanical connections, but may include electrical connections, whether direct or indirect. "Inner", "outer", "upper", "lower" and so on are only used to indicate relative positional relationship. When the absolute position of the described object changes, the relative positional relationship may also change accordingly.

It should be noted that the size and shape of each figure in the drawings do not reflect the true scale, but are only intended to illustrate the present disclosure. Additionally, the same or similar reference numerals represent the same or similar elements or elements having the same or similar functions throughout.

At present, information leakage prevention is applied to various display products, such as bank teller machines, high-end anti-peeping notebooks, monitor displays, vehicle displays, etc. Most of the existing anti-spy display products achieves anti-peeping by using collimated backlight systems, e.g., anti-peeping films, Collimate micro-Structure LGP, CML backlights, (backlight systems with low light brightness at side viewing angles) or adding the structure of the liquid crystal cell for filtering the light with a large viewing angle at the backlight position. However, since the brightness of the collimated backlight system cannot achieve extreme blackness at the side viewing angles, and the decrease in brightness from the front viewing angle to the side viewing angle is a gradual process from high to low, the effective emitting light of the display product can still be seen at the side viewing angle, so as to identify the relevant confidential information, so such anti-peeping display products still have the risk of leakage.

Figure 2:
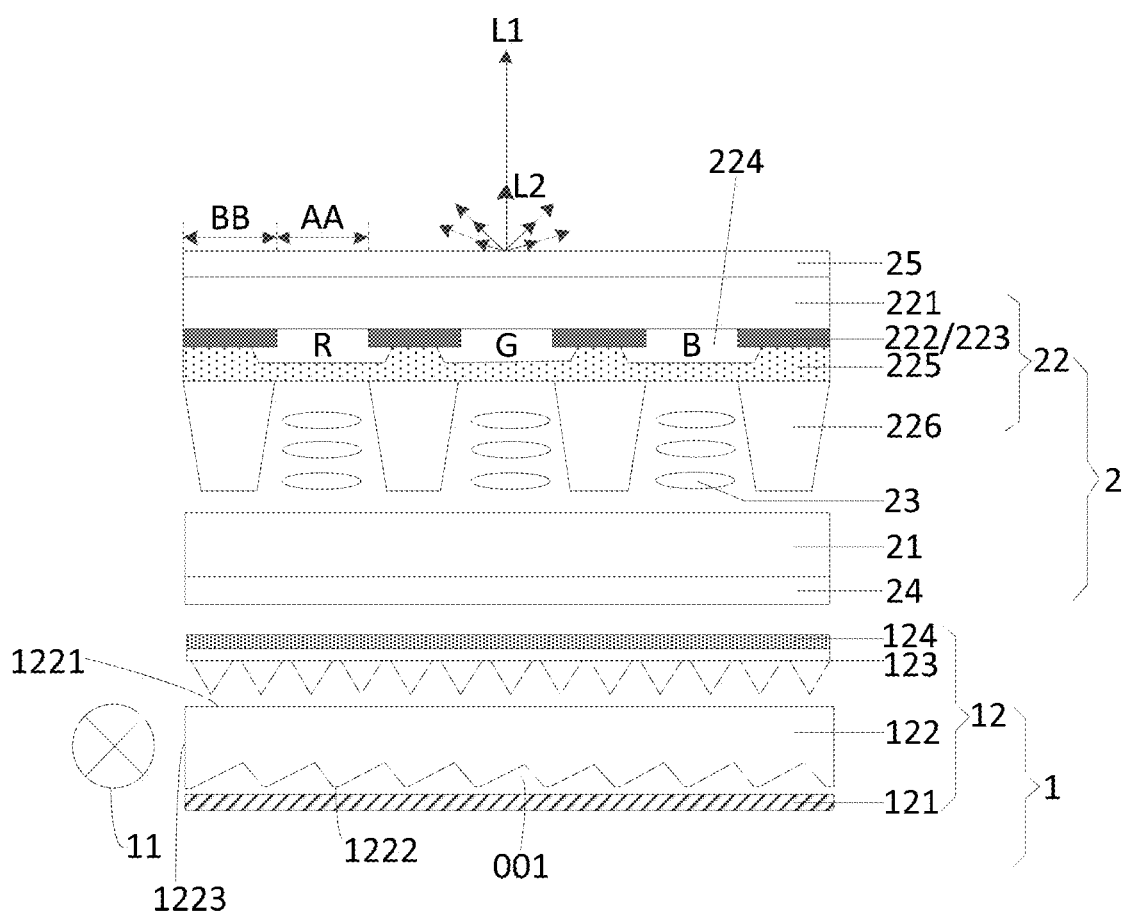
FIG. 2 is a schematic structural diagram of another anti-peeping display device provided by embodiments of the present disclosure.

In order to solve the problem that the anti-peeping display products still have the risk of leakage in the related art, embodiments of the present disclosure provides an anti-peeping display device, as shown in FIG. 1 and FIG. 2, including a collimated backlight module 1 and a liquid crystal display panel 2 that are stacked. The liquid crystal display panel 2 is located on a light emergent side of the collimated backlight module 1;

the liquid crystal display panel 2 includes an array substrate 21 and an opposite substrate 22 opposite to each other, the array substrate 21 is close to the collimated backlight module 1, and the opposite substrate 22 is away from the collimated backlight module 1;

the opposite substrate 22 includes:

a base substrate 221, provided with a plurality of light-transmitting regions AA and non-light-transmitting regions BB located between the adjacent light-transmitting regions AA; and a reflective layer 222 on the base substrate 221, an orthographic projection of the reflective layer 222 on the base substrate 221 overlaps with an orthographic projection of at least part of the non-light-transmitting region(s) BB on the base substrate 221, and the reflective layer 222 is configured to reflect ambient light.

The anti-peeping display device provided by the embodiments of the present disclosure can realize the anti-peeping display function by using the liquid crystal display panel with the collimated backlight module. In addition, by adding the reflective layer in the opposite substrate and the orthographic projection of the reflective layer on the base substrate overlapping with the orthographic projection of at least part of the non-light-transmitting region(s) on the base substrate, the added reflective layer will not affect the normal display. Additionally, the reflective layer is configured to reflect ambient light, so that when the ambient light reflected by the reflective layer enters the human eyes, an intensity of the reflected light of the ambient light at the front viewing angle is the same as an intensity of the reflected light of the ambient light at the side viewing angle. Due to using the collimated backlight module, the display panel corresponding to the side viewing angle has a lower luminous brightness, and the display panel corresponding to the front viewing angle has a higher luminous brightness. In this way, for the front viewing angle, the brightness of the reflected ambient light is much lower than the brightness of light emitted by the display panel itself, which does not affect the normal display. For the side viewing angle, the brightness of the reflected ambient light is greater than the brightness of light emitted by the display panel itself, and a ratio of the brightness of effective light emitted by the display panel to the brightness of total light seen by the human eyes is relatively low, and the human eyes at the side viewing angle cannot clearly see the displayed content. Therefore, in the embodiments of the present disclosure, the anti-peeping effect can be improved on the basis of implementing the anti-peeping display function by using the collimated backlight module.

In specific implementation, in the above anti-peeping display device provided by the embodiments of the present disclosure, as shown in FIG. 1 and FIG. 2, the orthographic projection of the reflective layer 222 on base substrate 221 completely overlaps with the orthographic projection of the non-light-transmitting regions BB on the base substrate 221. In this way, at the side viewing angle, the brightness of the reflected ambient light is much greater than the brightness of the light emitted by the display panel itself, and the ratio of the brightness of effective light emitted by the display panel to the brightness of total light seen by the human eyes is further reduced, so as to further improve the anti-peeping effect.

In specific implementation, since the display panel is generally provided with light-transmitting regions of multiple colors, in order to prevent crosstalk of light in adjacent light-transmitting regions, in the above anti-peeping display device provided by the embodiments of the present disclosure, as shown in FIG. 1, the reflective layer 222 is located on one side of the base substrate 221 facing the array substrate 21, and the opposite substrate 22 further includes a black matrix layer 223 located on one side of the reflective layer 222 facing the array substrate 21. The black matrix layer 223 defines the light-transmitting regions AA and the non-light-transmitting regions BB.

Figure 3:
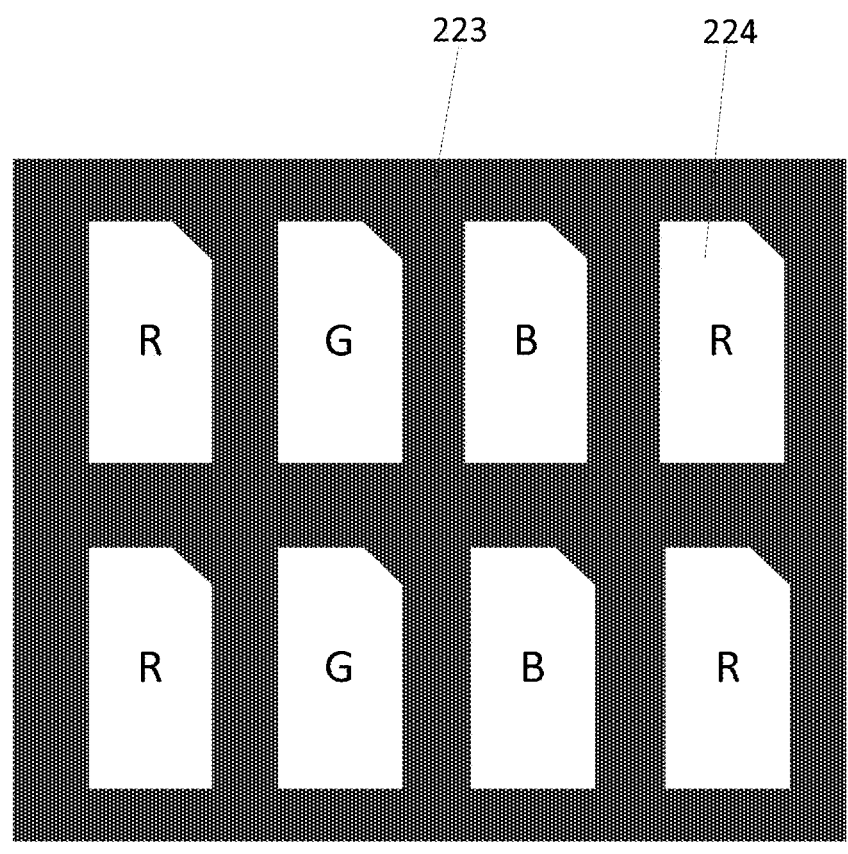
FIG. 3 is a top view of a black matrix layer and a color resist layer in FIG. 1.

In specific implementation, in the above anti-peeping display device provided by the embodiments of the present disclosure, as shown in FIG. 1, a pattern of the reflective layer 222 is the same as a pattern of the black matrix layer 223. Specifically, as shown in FIG. 3, FIG. 3 is a schematic top view diagram of the black matrix layer 223 and a color resist layer 224 (described later), and the pattern of the reflective layer 222 (not shown) is the same as the pattern of the black matrix layer 223. The main function of the added reflective layer 222 is to reflect ambient light into the human eyes. For the side viewing angle, since the luminous brightness of the liquid crystal display panel 2 itself is low, the reflected light of the reflective layer 222 to the ambient light enters the human eyes, which can greatly reduce a ratio of effective brightness of the liquid crystal display panel 2. In addition, the contrast ratio (CR, the ratio of the luminous brightness of the liquid crystal display panel 2 itself to the brightness of the total light) at the side viewing angle is greatly reduced due to the influence of ambient light, and it is more difficult for the human eyes to recognize the display content of the screen at the side viewing angle. Therefore, the added reflective layer 222 does not affect the normal display and transmittance of the liquid crystal display panel 2, so that a further anti-peeping effect can be achieved without affecting the normal display and transmittance.

In specific implementation, in the above anti-peeping display device provided by the embodiments of the present disclosure, as shown in FIG. 2, the reflective layer 22 is on one side of the base substrate 221 facing the array substrate 21, and the opposite substrate 22 further includes the black matrix layer 223 on one side of the reflective layer 222 facing the array substrate 21. The black matrix layer 223 defines the light-transmitting regions AA and the non-light-transmitting regions BB. The reflective layer 222 can be reused as the black matrix layer 223. In this way, the manufacturing process of the black matrix layer can be removed, thereby reducing the manufacturing process and cost.

It should be noted that in the embodiments of the present disclosure, the reflective layer 222 is located on one side of the base substrate 221 facing the array substrate 21 as an example. Of course, the reflective layer 222 may also be located on one side of the base substrate 221 away from the array substrate 21.

In specific implementation, in the above anti-peeping display device provided by the embodiments of the present disclosure, as shown in FIG. 1 and FIG. 2, a material of the reflective layer 222 may be metal. Specifically, the metal may be a material with high reflectivity such as aluminum or silver, but of course it is not limited thereto.

Figure 4:
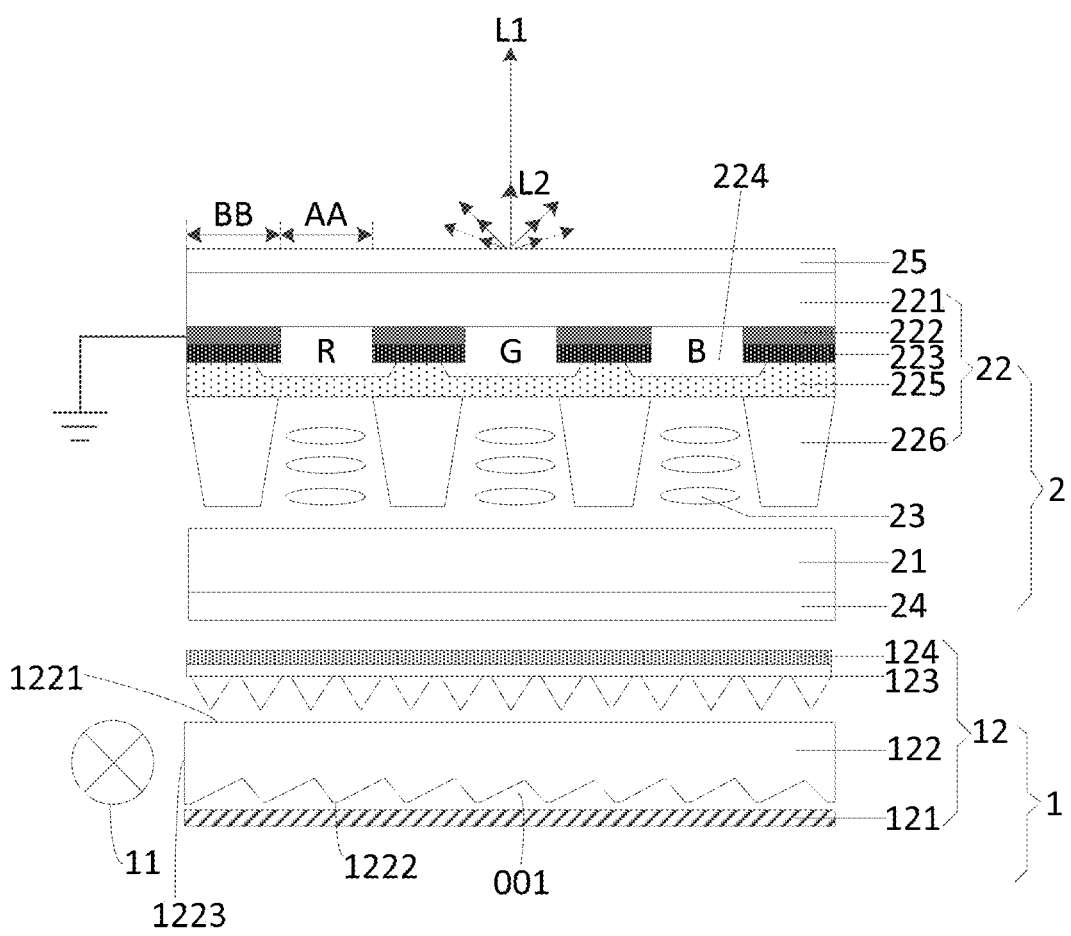
FIG. 4 is a schematic structural diagram of another anti-peeping display device provided by embodiments of the present disclosure.
Figure 5:
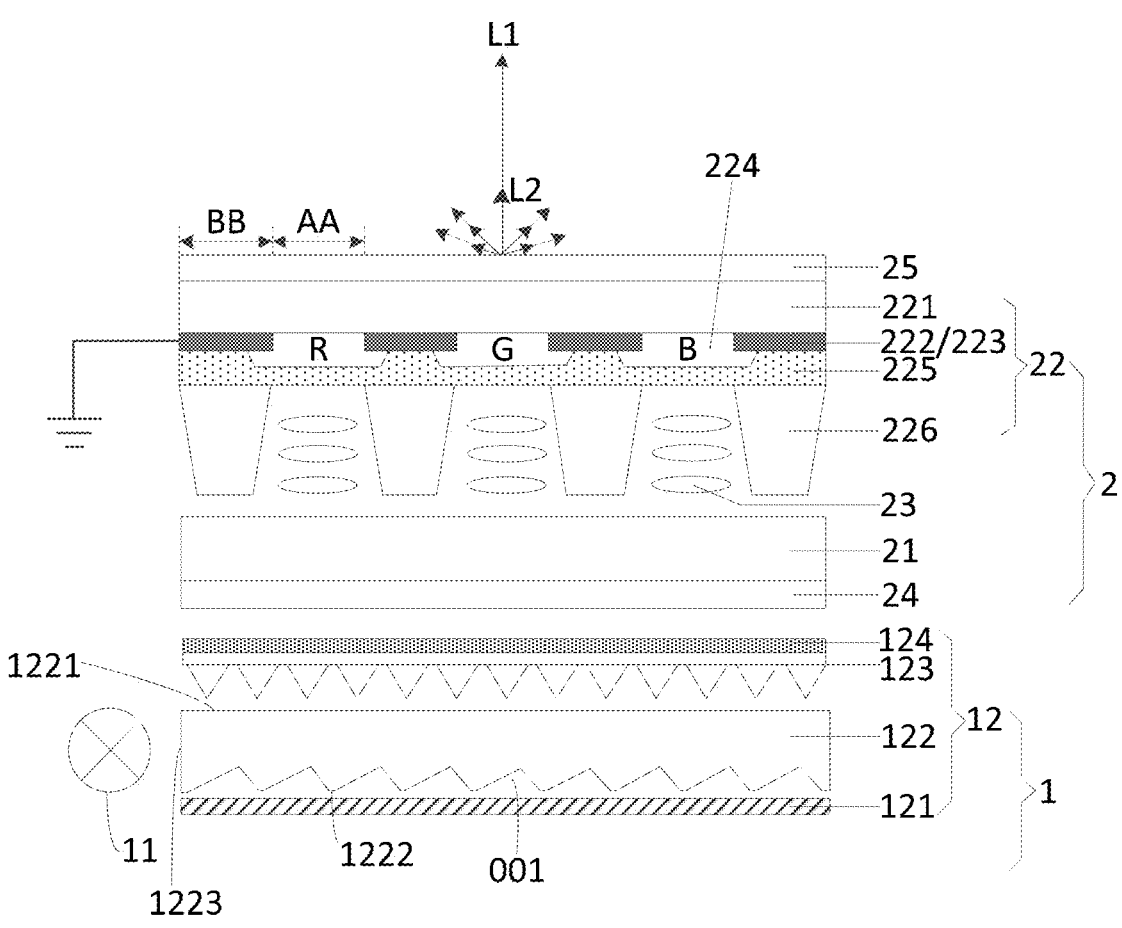
FIG. 5 is a schematic structural diagram of another anti-peeping display device provided by embodiments of the present disclosure.

In specific implementation, in the above anti-peeping display device provided by the embodiments of the present disclosure, as shown in FIG. 4 and FIG. 5, the reflective layer 222 may be grounded. In this way, the reflective layer 222 can also play the role of electrostatic shielding, thereby reducing the manufacture of the shielding layer and reducing the manufacturing process and cost.

As shown in FIG. 1, FIG. 2, FIG. 4 and FIG. 5, for a conventional anti-peeping display device, the effective light rays emitted by the liquid crystal display panel 2 at the front viewing angles and the side viewing angles are indicated by solid arrows L1, and the length of the arrow L1 represents the strengths of the light rays at the front viewing angles and the side viewing angles. It can be seen that, for the conventional anti-peeping display device, the brightness of the light rays at the side viewing angle(s) is much lower than that at the front viewing angle(s). In order to avoid information leakage due to light leakage under low brightness at the side viewing angle, in the disclosure, the reflective layer 222 with the same pattern as the black matrix layer 223 is added between the base substrate 221 and the black matrix layer 223 of the opposite substrate 22 or the reflective layer 222 is directly used to replace the black matrix layer 223. The light rays of ambient light reflected by the reflective layer 222 are shown by dotted arrows L2. The brightness of the reflected ambient light is consistent under the front viewing angle and the side viewing angle. For the front viewing angle, the brightness of the reflected ambient light is much lower than the brightness of light emitted by the liquid crystal display 2 itself, so the added reflective layer 222 does not affect the normal display. For the side viewing angle, the brightness of the reflected ambient light is greater than the brightness of light emitted by the liquid crystal display panel 2 itself, and a ratio of the effective light emitted by the liquid crystal display panel 2 to the total light seen by the human eyes is relatively low, and the human eyes cannot clearly see the displayed content at the side viewing angle. Therefore, in the embodiments of the present disclosure, the anti-peeping effect can be improved.

Figure 6:
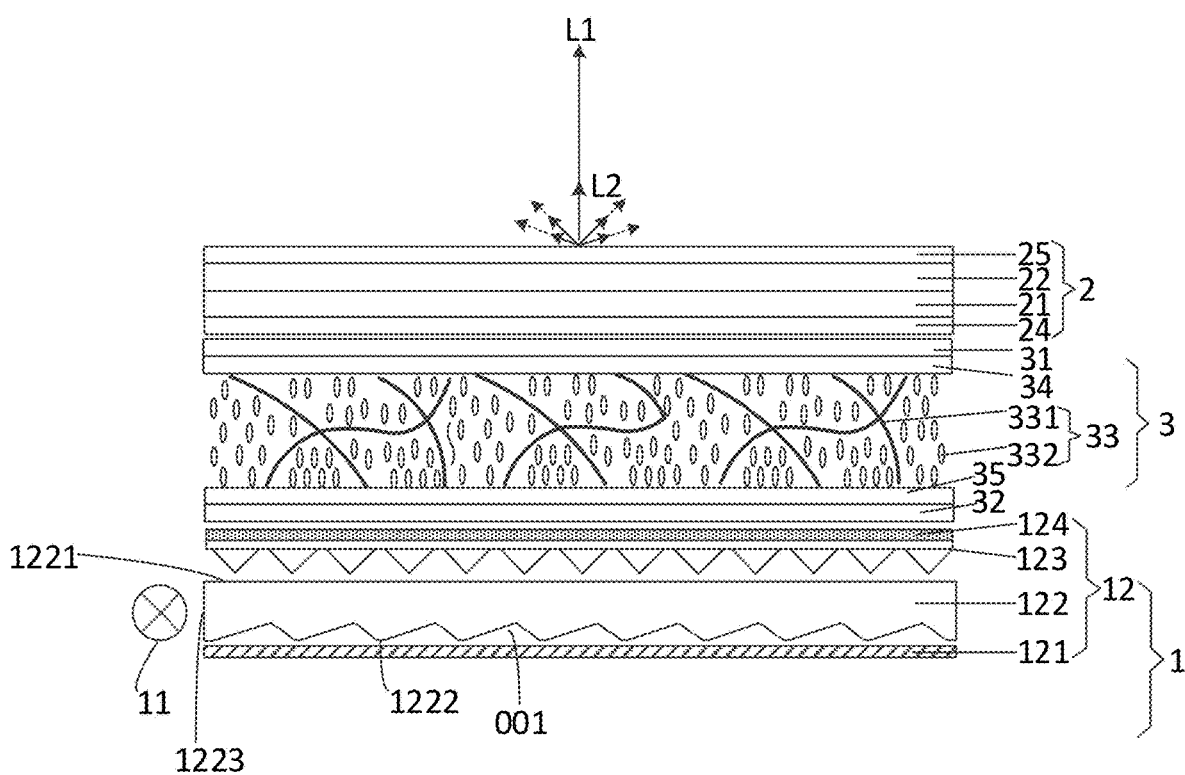
FIG. 6 is a schematic structural diagram of another anti-peeping display device provided by embodiments of the present disclosure.
Figure 7:
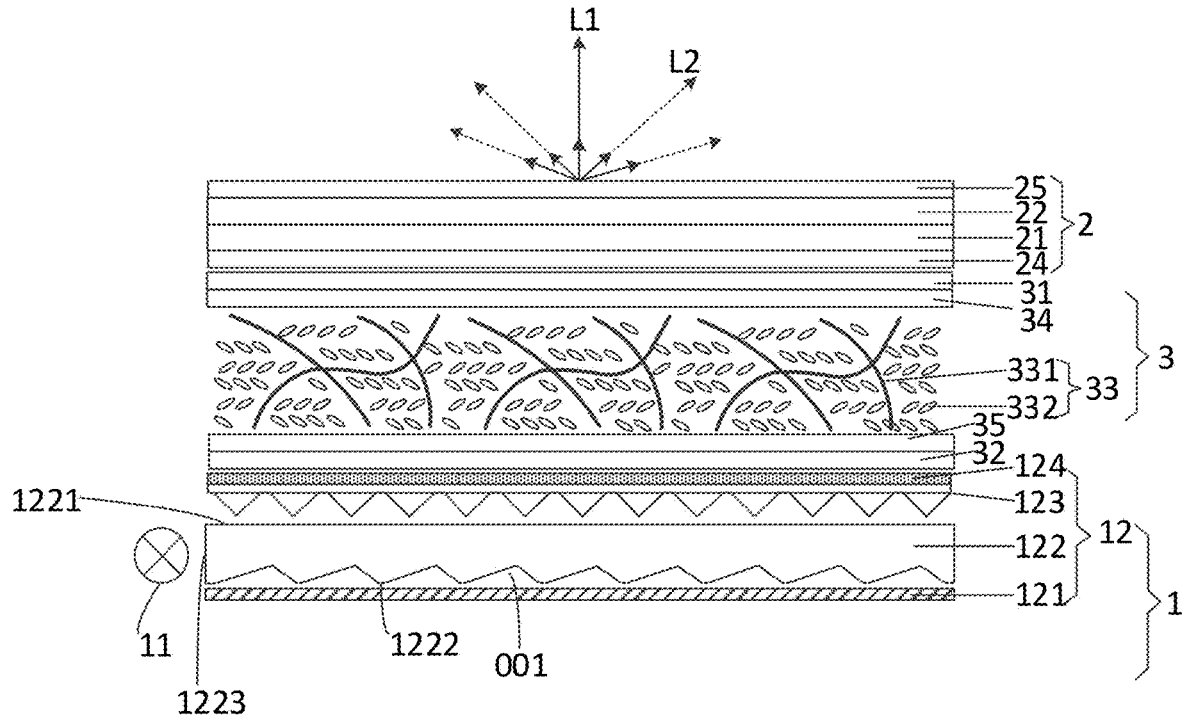
FIG. 7 is a schematic structural diagram of another anti-peeping display device provided by embodiments of the present disclosure.

In specific implementation, the above anti-peeping display device provided by the embodiments of the present disclosure, as shown in FIG. 6 and FIG. 7, further includes a liquid crystal polymer structure 3 between the collimated backlight module 1 and the liquid crystal display panel 2. The liquid crystal polymer structure 3 includes: a first substrate 31 and a second substrate 32 opposite to each other, a liquid crystal polymer layer 33 between the first substrate 31 and the second substrate 32, a first electrode 34 between the first substrate 31 and the liquid crystal polymer layer 33, and a second electrode layer 35 between the second substrate 32 and the liquid crystal polymer layer 33.

The liquid crystal polymer structure 3 is configured to control a refractive index of the liquid crystal polymer layer 33 by applying an electric field between the first electrode layer 34 and the second electrode layer 35, so that the liquid crystal polymer layer 33 switches between a transparent state and an opaque state.

Specifically, as shown in FIG. 6 and FIG. 7, the liquid crystal polymer layer 33 is a polymer dispersed liquid crystal, PDLC structure, that is, the liquid crystal polymer layer 33 includes a polymer 331 and liquid crystal molecules 332 dispersed in the polymer 331. The polymer 331 may include, but not limited to, photopolymerizable compounds or mixtures thereof, such as polycyclic aromatic hydrocarbons, condensed ring aromatic hydrocarbons, cyclopolyenes, and the like.

The dielectric constant of the liquid crystal molecules 332 along the long axis direction is different from the dielectric constant of the liquid crystal molecules 332 along the short axis direction. An dielectric constant component along the long axis direction of the liquid crystal molecules 332 is generally defined as Ell, and an dielectric constant component along a direction perpendicular to the long axis direction of the liquid crystal molecules 332 is generally defined as $\varepsilon\perp$, the difference between the two are $\Delta\varepsilon=\varepsilon\|-\varepsilon\perp$. When $\Delta\varepsilon>0$, the liquid crystal molecules 332 are called positive liquid crystals electrically, and the long axis of the liquid crystal molecules 332 rotates in a direction parallel to a direction of the electric field; when $\Delta\varepsilon<0$, the liquid crystal molecules 332 are called negative liquid crystals, and the long axis of the liquid crystal molecules 332 rotates in a direction perpendicular to the direction of the electric field. When the electric field is strong enough, the liquid crystal molecules 332 are finally aligned along a direction parallel to or perpendicular to the direction of the electric field. In FIG. 6 and FIG. 7 of the embodiments of the present disclosure, the liquid crystal molecules 332 are negative liquid crystals as an example.

As shown in FIG. 6, when the first electrode layer 34 and the second electrode layer 35 are not powered on, the liquid crystal molecules 332 are arranged longitudinally and uniformly due to the initial action of the chains of the polymer 331. By this time, the refractive index of the liquid crystal molecules 332 matches the refractive index of the polymer 331, the refractive index of the liquid crystal polymer structure 3 is uniform, the liquid crystal polymer structure 3 is in the transparent state, and the light rays emitted by the collimated backlight module 1 do not scatter when passing through the liquid crystal polymer structure 3. Thai is, the light rays emitted by the collimated backlight module 1 do not change their propagation directions when passing through the liquid crystal polymer structure 3, and the collimated light emitted by the collimated backlight module 1 remains in a collimated state and is emitted to the liquid crystal display panel 2. In FIG. 6, the brightness of the light rays L2 of the side viewing angle is much lower than the brightness of the light rays L1 of the front viewing angle, so it can realize the anti-peeping function.

As shown in FIG. 7, when the first electrode layer 34 and the second electrode layer 35 are powered on, the negative liquid crystal molecules 332 are deflected to the horizontal direction under the action of the longitudinally electric field. By this time, the liquid crystal molecules 332 in the liquid crystal polymer structure 3 are scattered, the refractive index of the liquid crystal molecules 332 does not match the refractive index of the polymer 331, the liquid crystal polymer structure 3 is in the opaque state (scattering state), and the collimated light rays emitted by the collimated backlight module 1 are scattered when passing through the liquid crystal polymer structure 3, so their collimation is destroyed. The luminous brightness of the liquid crystal display panel 2 itself is higher in the direction of the side viewing angle. By this time, the reflective layer 222 added in the opposite substrate 22 of the present disclosure reflects ambient light, but the brightness of the reflected ambient light corresponding to the side viewing angle is much smaller than the self-luminous brightness of the display panel in the direction of the side viewing angle, and the reflected ambient light does not affect the viewing at the side viewing angle. In FIG. 7, the light ray L2 of the side viewing angle is similar to the light ray L1 of the front viewing angle in brightness, so the content displayed on the screen can be still seen clearly at the large viewing angle, that is, the shared state display is realized.

Therefore, in the embodiments of the present disclosure, by disposing the liquid crystal polymer structure 3 between the collimated backlight module 1 and the liquid crystal display panel 2, the switch between the anti-peeping state display and the shared state display can be realized, and the user can choose the anti-peeping state or the shared state according to actual needs.

Specifically, as shown in FIG. 6 and FIG. 7, the first substrate 31 and the second substrate 32 can be glass substrates or plastic substrates. The materials of the first electrode layer 34 and the second electrode layer 35 can be indium tin oxide, nano silver wire or graphene. The transmittance of the liquid crystal polymer layer 33 can show a gradual change characteristic with the change of the applied electric field, that is, the liquid crystal polymer structure 3 can also realize the gray scale adjustment function.

It should be noted that FIG. 6 and FIG. 7 do not illustrate the specific structure of the liquid crystal display panel 2, and the specific structure of the liquid crystal display panel 2 in FIG. 6 and FIG. 7 is the same as the specific structure of the liquid crystal display panel in FIG. 2. The structures shown in FIG. 6 and FIG. 7 are embodiments in which the liquid crystal polymer structure 3 is further added on the basis of FIG. 1, FIG. 2, FIG. 4 or FIG. 5.

Figure 8:
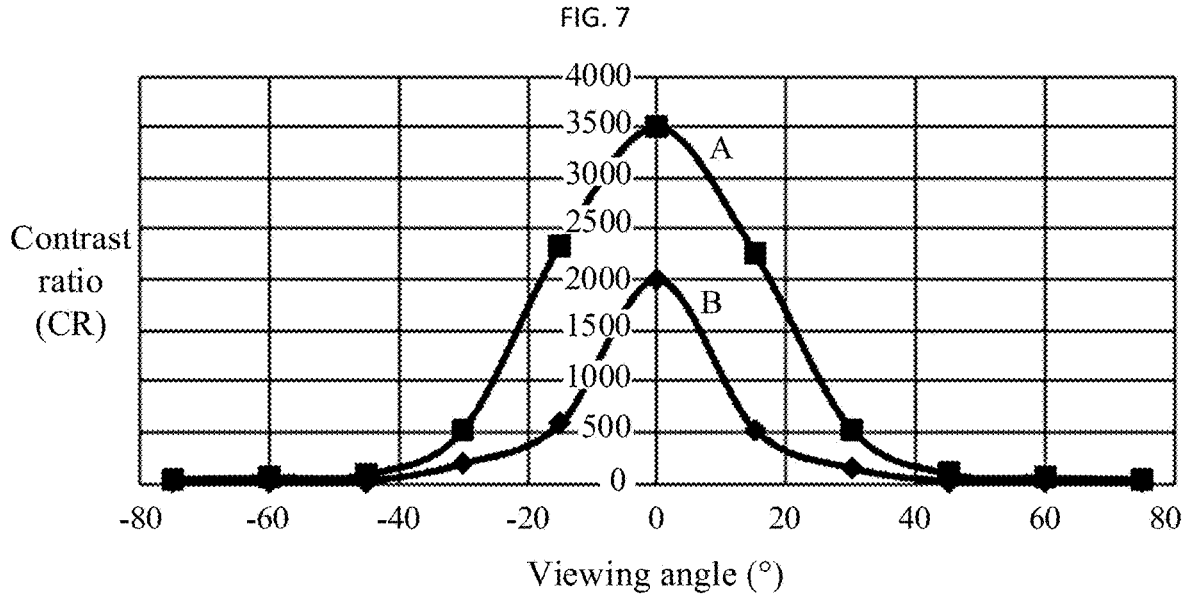
FIG. 8 is a comparison of curves of contrast ratios (CRs) changing with viewing angles before and after adding a reflective layer.
Figure 9:
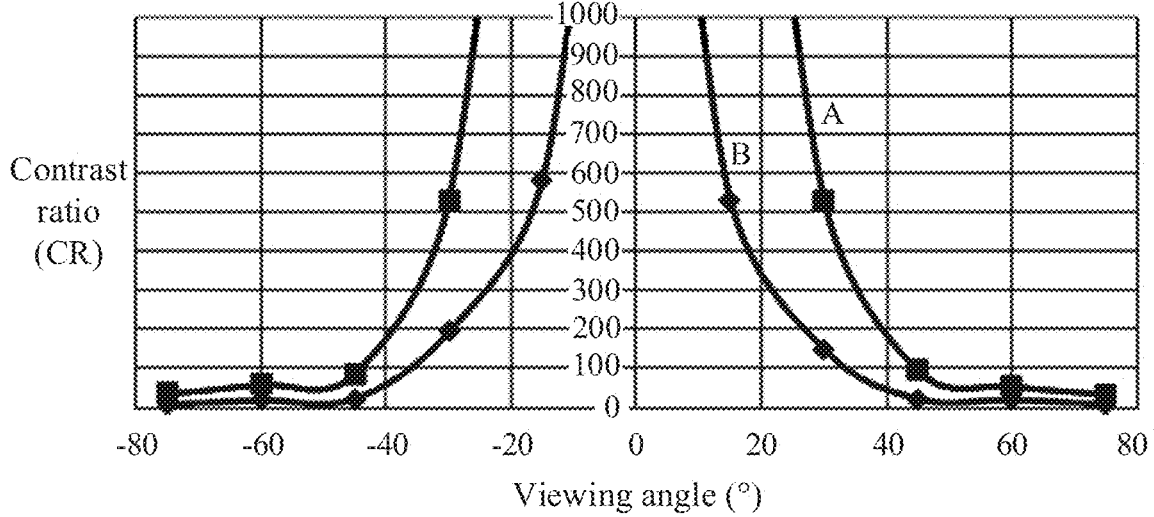
FIG. 9 is a partially enlarged schematic diagram of FIG. 8.

As shown in FIG. 8 and FIG. 9, FIG. 8 is a comparison of curves of the contrast ratios (CRs) changing with viewing angles before and after adding the reflective layer 222 in the opposite substrate 22 of the liquid crystal display panel 2. FIG. 9 is a partially enlarged schematic diagram of FIG. 8. The curve A is a curve without adding the reflective layer 222, and the curve B is a curve when the reflective layer 222 is added. It can be seen from the curves A and B that after the reflective layer 222 is added, due to the interference of ambient light, the brightness of the dark state at the side viewing angle can be greatly improved, the CR of the side viewing angle is greatly reduced, and the screen display at the side viewing angle is relatively blurred, so the anti-peeping effect is upgraded.

Figure 10A:
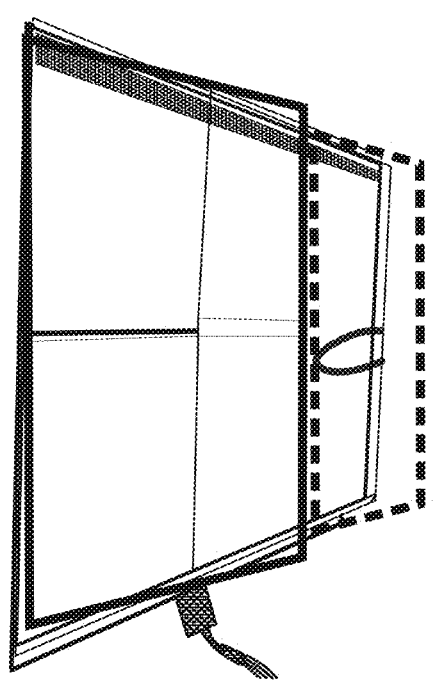
FIG. 10A is anti-peeping display effect diagrams of white screens corresponding to left viewing angles before and after adding a reflective layer.
Figure 10B:
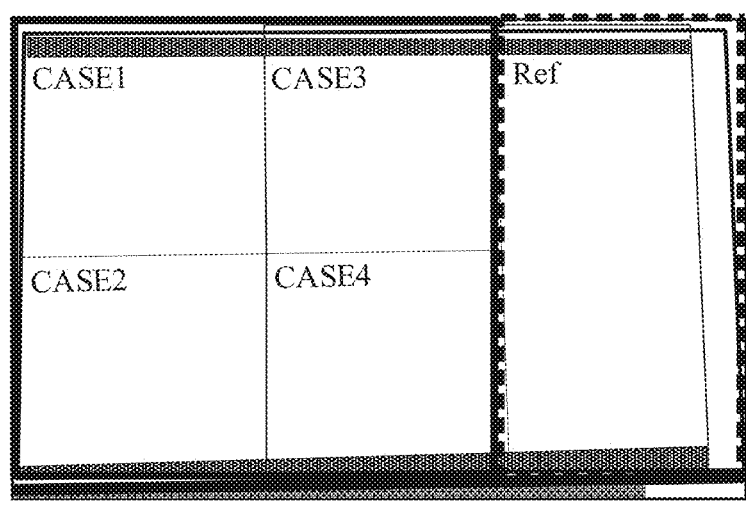
FIG. 10B is anti-peeping display effect diagrams of white screens corresponding to front viewing angles before and after adding a reflective layer.
Figure 10C:
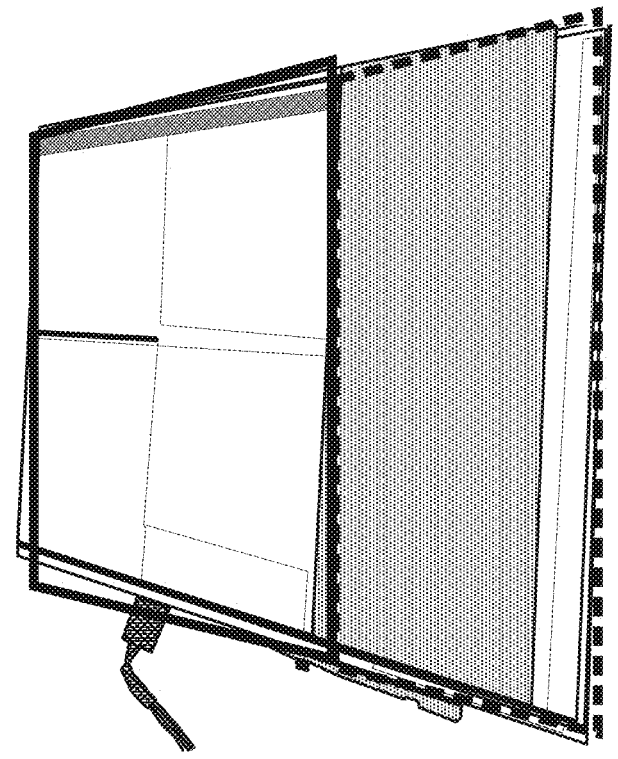
FIG. 10C is anti-peeping display effect diagrams of white screens corresponding to right viewing angles before and after adding a reflective layer.

As shown in FIG. 10A to FIG. 10C, FIG. 10A to FIG. 10C show the anti-peeping display effects of the white screens corresponding to the left viewing angle, the front viewing angle and the right viewing angle before and after adding the reflective layer 222 in the opposite substrate 22 of the liquid crystal display panel 2. The effect diagrams when the reflective layer 222 is added are shown in the solid line boxes in FIG. 10A-FIG. 10C. The effect diagrams without adding the reflective layer 222 are shown in the dotted line boxes in FIG. 10A-FIG. 10C. It can be seen from FIG. 10B, the presence or absence of the reflective layer 222 has no influence on the display at the normal viewing angle. It can be seen from FIG. 10A and FIG. 10C that, for the left viewing angle and the right viewing angle, the ratio of the brightness of the effective light emitted by the liquid crystal display panel can be reduced by adding the reflective layer 222, and the liquid crystal display panel with the reflective layer 222 presents the reflective effect at the side viewing angle, which can enhance the anti-peeping effect.

Figure 11:
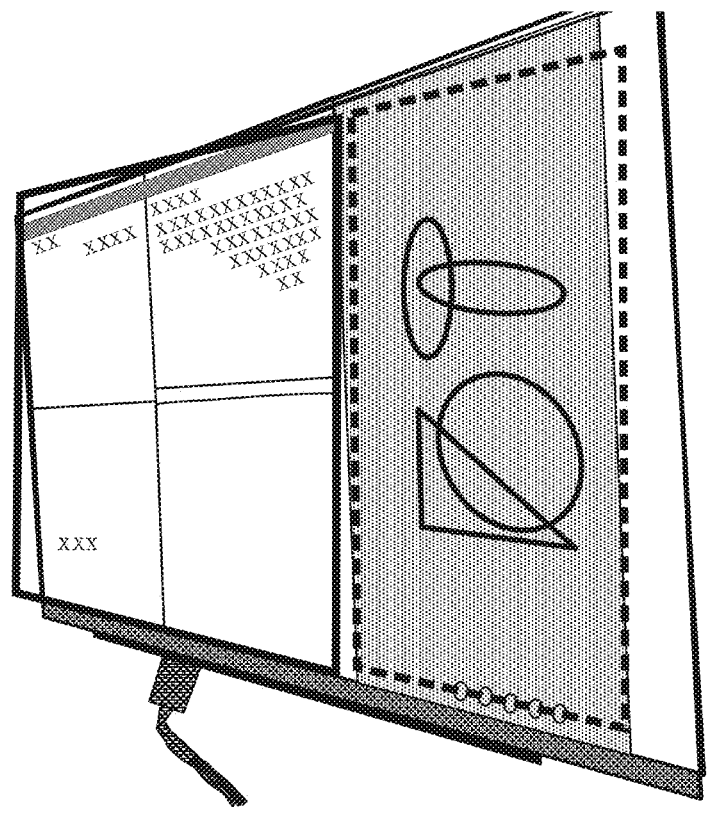
FIG. 11 is anti-peeping display effect diagram of a black and white text screen before and after adding a reflective layer.

As shown in FIG. 11, FIG. 11 is an anti-peeping display effect diagram of a black and white text screen before and after adding the reflective layer 222 in the opposite substrate 22 of the liquid crystal display panel 2. The effect diagram when the reflective layer 222 is added is shown in the solid line box in FIG. 11, and the effect diagram without adding the reflective layer 222 is shown in the dotted line frame in FIG. 11. From the side viewing angle, the text content in the screen with the reflective layer 222 cannot be recognized, and the text information in the screen without the reflective layer 222 can still be distinguished in the anti-peeping state.

Therefore, adding the reflective layer 222 in the liquid crystal display panel 2 in the present disclosure can effectively improve the anti-peeping effect and realize an upgrade of the anti-peeping effect.

In specific implementation, in the above anti-peeping display device provided by the embodiments of the present disclosure, as shown in FIG. 1, FIG. 2, and FIG. 4 to FIG. 7, the collimated backlight module 1 includes a side-incident light source 11 and a dimming structure 12. The side-incident light source 11 is located on a light incident side of the dimming structure 12; the side-incident light source 11 is configured to provide incident light to the dimming structure 12; and the dimming structure 12 is configured to adjust a light emergent direction of the incident light, so as to the light emergent side of the dimming structure 12 emits collimated light.

In specific implementation, in the above anti-peeping display device provided by the embodiments of the present disclosure, as shown in FIG. 1, FIG. 2, and FIG. 4 to FIG. 7, the dimming structure 12 includes a reflective sheet 121 and a light guide plate 122 that are stacked. The light guide plate 122 is provided with a light emergent surface 1221 and a bottom surface 1222 opposite to each other. The bottom surface 1222 of the light guide plate 122 is provided with a plurality of dimming microstructures 001. The reflective sheet 121 is located on the bottom surface 1222 of the light guide plate 122. The incident light is configured to be incident from a side surface 1223 of the light guide plate side.

The dimming structure 12 further includes: a reverse prism sheet 123 located on one side of the light guide plate 122 away from the reflective sheet 121, and an anti-peeping film 124 located on one side of the reverse prism sheet 123 away from the reflective sheet 121. That is, by adding the anti-peeping film 124 on the inverse prism sheet 123 of a traditional backlight module, a collimated backlight can be realized to realize an anti-peeping display.

Specifically, the dimming microstructure 001 may be a concave portion formed on the bottom surface 1222, and the bottom surface between adjacent concave portions forms a convex portion. The dimming microstructure 001 is used to adjust the direction of the light ray, so that the light rays are more in line with the optimal incident light angle of the inverse prism plate 123 after the light rays are emitted from the light guide plate 122, to achieve the purpose of increasing the brightness in the forward direction.

Certainly, the dimming structure 12 further also includes other optical functional film layers, such as a diffusion sheet and the like.

It should be noted that the dimming structure 12 is the same as that in the prior art, and the dimming principle of the dimming structure 12 is not described in detail in the embodiments of the present disclosure.

It should be noted that the collimated backlight module 1 provided by the embodiments of the present disclosure is only a structure capable of emitting collimated light. Of course, it can also be other collimated backlight modules capable of emitting collimated light, all of which belong to the claimed scope of the embodiments of the disclosure.

In specific implementation, in the above anti-peeping display device provided by the embodiments of the present disclosure, as shown in FIG. 1, FIG. 2, and FIGS. 4-7, the opposite substrate 22 also includes a color resist layer 224 on one side of the black matrix layer 223 away from the base substrate 221, a planarization layer 225 on one side of the color resist layer 224 away from the base substrate 221, and a spacer layer 226 on one side of the planarization layer 225 away from the base substrate 221. The color resist layer 224 Includes a plurality of color resists (such as a red color resist R, a green color resist G and a blue color resist B), the color resists (R, G, B) which are located in the light-transmitting regions AA, and the spacer layer 226 is used to control cell gap of the liquid crystal display panel 2.

In specific implementation, in the above anti-peeping display device provided by the embodiments of the present disclosure, as shown in FIG. 1, FIG. 2, and FIGS. 4-7, the liquid crystal display panel 2 further includes: a liquid crystal layer 23 between the array substrate 21 and the opposite substrate 22, the first polarizer 24 on one side of the array substrate 21 away from the opposite substrate 22, and the second polarizer 25 on one side of the opposite substrate 22 away from the array substrate 21.

Of course, the liquid crystal display panel 2 further includes other functional film layers, such as a pixel electrode layer, a common electrode layer, an alignment film layer, etc., which will not be introduced here in the embodiments of the present disclosure. Moreover, the display principle of the liquid crystal display panel 2 is the same as that of the prior art, and will not be described in detail in the embodiments of the present disclosure.

It should be noted that, the liquid crystal display panel provided by the embodiments of the present disclosure may include VA type, IPS type, TN type, etc., which are currently common liquid crystal display modes.

The above anti-peeping display device provided by the embodiments of the present disclosure can realize the anti-peeping display function by using the liquid crystal display panel with the collimated backlight module. In addition, by adding the reflective layer in the opposite substrate and the orthographic projection of the reflective layer on the base substrate overlapping with the orthographic projection of at least part of the non-light-transmitting region(s) on the base substrate, the added reflective layer will not affect the normal display. Additionally, the reflective layer is configured to reflect ambient light, so that when the ambient light reflected by the reflective layer enters the human eyes, an intensity of the reflected light of the ambient light at the front viewing angle is the same as an intensity of the reflected light of the ambient light at the side viewing angle. Due to using the collimated backlight module, the display panel corresponding to the side viewing angle has a lower luminous brightness, and the display panel corresponding to the front viewing angle has a higher luminous brightness. In this way, for the front viewing angle, the brightness of the reflected ambient light is much lower than the brightness of light emitted by the display panel itself, which does not affect the normal display. For the side viewing angle, the brightness of the reflected ambient light is greater than the brightness of light emitted by the display panel itself, and a ratio of the brightness of effective light emitted by the display panel to the brightness of total light seen by the human eyes is relatively low, and the human eyes at the side viewing angle cannot clearly see the displayed content. Therefore, in the embodiments of the present disclosure, the anti-peeping effect can be improved on the basis of implementing the anti-peeping display function by using the collimated backlight module.

While preferred embodiments of the present disclosure have been described, additional changes and modifications can be made to these embodiments by those skilled in the art once the basic inventive concept is appreciated. Therefore, it is intended that the appended claims be construed to cover the preferred embodiment and all changes and modifications which fall within the scope of the present disclosure.

Apparently, those skilled in the art can make various changes and modifications to the embodiments of the present disclosure without departing from the spirit and scope of the embodiments of the present disclosure. In this way, if these changes and modifications of the embodiments of the present disclosure fall within the scope of the claims of the present disclosure and their equivalent technologies, the present disclosure also intends to include these changes and modifications.

What is claimed is:

1. An anti-peeping display device, comprising: a collimated backlight module and a liquid crystal display panel that are stacked, and the liquid crystal display panel is on a light emergent side of the collimated backlight module; wherein the liquid crystal display panel comprises an array substrate and an opposite substrate opposite to each other, the array substrate is close to the collimated backlight module, and the opposite substrate is away from the collimated backlight module; wherein the opposite substrate comprises:

a base substrate provided with a plurality of light-transmitting regions and non-light-transmitting regions between the light-transmitting regions that are adjacent to each other; and a reflective layer on the base substrate, wherein an orthographic projection of the reflective layer on the base substrate overlaps with an orthographic projection of at least part of the non-light-transmitting region on the base substrate, and the reflective layer is configured to reflect ambient light.

2. The anti-peeping display device according to claim 1, wherein the orthographic projection of the reflective layer on the base substrate completely overlaps with the orthographic projection of the non-light-transmitting regions on the base substrate.

3. The anti-peeping display device according to claim 2, wherein the reflective layer is on a side facing the array substrate, of the base substrate, and the opposite substrate further comprises a black matrix layer on a side facing the array substrate, of the reflective layer, wherein the black matrix layer defines the light-transmitting regions and the non-light-transmitting regions.

4. The anti-peeping display device according to claim 3, wherein a pattern of the reflective layer is identical to a pattern of the black matrix layer.

5. The anti-peeping display device according to claim 3, wherein the opposite substrate further comprises a color resist layer on a side away from the base substrate, of the black matrix layer, a planarization layer on a side away from the base substrate, of the color resist layer, and a spacer layer on a side away from the base substrate, of the planarization layer; wherein the color resist layer comprises a plurality of color resists, and the plurality of color resists is in the light-transmitting regions.

6. The anti-peeping display device according to claim 2, wherein the reflective layer is on a side facing the array substrate, of the base substrate, and the opposite substrate further comprises a black matrix layer on a side facing the array substrate, of the reflective layer, wherein the black matrix layer defines the light-transmitting regions and the non-light-transmitting regions; and the reflective layer is reused as the black matrix layer.

7. The anti-peeping display device according to claim 1, wherein a material of the reflective layer is metal.

8. The anti-peeping display device according to claim 7, wherein the reflective layer is grounded.

9. The anti-peeping display device according to claim 1, further comprising: a liquid crystal polymer structure between the collimated backlight module and the liquid crystal display panel; wherein the liquid crystal polymer structure comprises: a first substrate and a second substrate opposite to each other, a liquid crystal polymer layer between the first substrate and the second substrate, a first electrode between the first substrate and the liquid crystal polymer layer, and a second electrode layer between the second substrate and the liquid crystal polymer layer; and the liquid crystal polymer structure is configured to control a refractive index of the liquid crystal polymer layer by applying an electric field between the first electrode layer and the second electrode layer, so that the liquid crystal polymer layer switches between a transparent state and an opaque state.

10. The anti-peeping display device according to claim 1, wherein the collimated backlight module comprises a side-incident light source and a dimming structure, and the side-incident light source is on a light incident side of the dimming structure; the side-incident light source is configured to provide incident light to the dimming structure; and the dimming structure is configured to adjust a light emergent direction of the incident light, so that the light emergent side of the dimming structure emits collimated light.

11. The anti-peeping display device according to claim 10, wherein the dimming structure comprises a reflective sheet and a light guide plate that are stacked; wherein the light guide plate is provided with a light emergent surface and a bottom surface opposite to each other, the bottom surface of the light guide plate is provided with a plurality of dimming microstructures, the reflective sheet is located on the bottom surface of the light guide plate, and the incident light is configured to be incident from a side surface of the light guide plate; and the dimming structure further comprises: a reverse prism sheet on a side away from the reflective sheet, of the light guide plate, and an anti-peeping film on a side away from the reflective sheet, of the reverse prism sheet.

12. The anti-peeping display device according to claim 1, wherein the liquid crystal display panel further comprises: a liquid crystal layer between the array substrate and the opposite substrate, a first polarizer on a side away from the opposite substrate, of the array substrate, and a second polarizer on a side away from the array substrate, of the opposite substrate.

\* \* \* \* \*